US00RE39704E

(19) United States
(12) Reissued Patent
Purvey

(10) Patent Number: US RE39,704 E
(45) Date of Reissued Patent: Jun. 26, 2007

(54) CENTRIFUGAL SEPARATOR WITH WEIGHT THRUST BEARING

(75) Inventor: Ronald J. Purvey, Axminster (GB)

(73) Assignee: Filterwerk Mann & Hummel GmbH, Ludwigsburg (DE)

(21) Appl. No.: 10/151,021

(22) PCT Filed: Dec. 5, 1996

(86) PCT No.: PCT/GB96/02996

§ 371 (c)(1),
(2), (4) Date: Jun. 9, 1998

(87) PCT Pub. No.: WO97/23296

PCT Pub. Date: Jul. 3, 1997

Related U.S. Patent Documents

Reissue of:
(64) Patent No.: 6,095,964
Issued: Aug. 1, 2000
Appl. No.: 09/091,157
Filed: Jun. 9, 1998

(30) Foreign Application Priority Data

Dec. 23, 1995 (GB) ..... 9526523

(51) Int. Cl.
*B04B 9/06* (2006.01)

(52) U.S. Cl. ..... 494/49; 494/83
(58) Field of Classification Search ..... 494/24, 494/36, 43, 49, 64, 65, 67, 83, 84, 901; 210/168, 210/171, 232, 360.1, 380.1, 416.5; 184/6.24; 384/192–194, 246
See application file for complete search history.

(56) References Cited

U.S. PATENT DOCUMENTS 1,362,619 A 12/1920 Hall
1,373,085 A 3/1921 Leitch
1,783,546 A * 12/1930 Petsche et al.
2,648,496 A * 8/1953 Cresswell
2,650,022 A 8/1953 Fulton et al.
2,701,170 A * 2/1955 Reason et al.
2,723,079 A 11/1955 Fulton et al.
2,741,517 A * 4/1956 Reason
3,784,092 A 1/1974 Gibson
4,492,631 A 1/1985 Martin
4,615,315 A 10/1986 Graham
5,096,581 A 3/1992 Purvey
6,354,987 B1 * 3/2002 Frehland et al. ..... 494/49
6,424,067 B1 * 7/2002 Samways ..... 494/83
6,530,872 B2 * 3/2003 Frehland et al. ..... 494/49

FOREIGN PATENT DOCUMENTS

DE 2205089 8/1972
EP 0193000 9/1986
GB 723339 2/1955
JP 61-116117 * 6/1986

OTHER PUBLICATIONS

Copy of Search Report.

* cited by examiner

*Primary Examiner*—Charles E. Cooley
(74) *Attorney, Agent, or Firm*—Crowell & Moring LLP

(57) ABSTRACT

A self-powered centrifugal separator, for separating particulate contaminants from a liquid lubricant of an automobile engine, includes a rotor container rotatable about an axle to which it is journalled by bushes. When the engine is running, a film of pressurized liquid between the bushes and axle lubricates them and provides radial stiffness, but when the engine stops and liquid supply ceases, radial stiffness is reduced and the partially emptying container may vibrate and create wind-down noise. At least one bush, which normally provides a horizontal thrust bearing to support the weight of the container at low speed, has, with the axle portion it surrounds, a region tapering in diameter to center the container with respect to the axle and provide both radial and axial support.

18 Claims, 2 Drawing Sheets

CENTRIFUGAL SEPARATOR WITH WEIGHT THRUST BEARING

Matter enclosed in heavy brackets [ ] appears in the original patent but forms no part of this reissue specification; matter printed in italics indicates the additions made by reissue.

BACKGROUND

This invention relates to centrifugal separators of the self-powered kind for separating particulate contaminants from a liquid, such as a vehicle engine lubricant, within a containment rotor to which contaminated liquid is supplied at elevated pressure, and particularly, but not exclusively, relates to low-cost disposable rotors for use with passenger automobile engines.

Self-powered centrifugal separators are well known for separating fluids of different densities or for separating particulate matter from liquids and have long been used in lubrication systems for engines and analogous items of vehicles. Such devices are described in, for example, GB 735658, GB 757538, GB 2160796, or GB 2283694.

The common principle of operation is that a housing contains a rotor which is supported therein to spin at high speed about a substantially vertical axis. The rotor comprises a container to which contaminated liquid lubricant is supplied at elevated pressure along the axis of rotation at one end of the rotor and is ejected from tangentially directed reaction jet nozzles at the other end of the rotor into the housing from which it drains to the engine sump. The energy lost by the ejected liquid effects rotation of the rotor about the axis at a speed, in excess of 8,000 rpm, fast enough for the liquid circulating in, and passing through, the rotor to deposit solid contaminants on radially outward surfaces. For efficient separation, and to ensure that separated contaminants do not interfere with the reaction jet nozzles, the rotor container is provided with a radially inwardly extending partition wall that effectively divides the rotor into a separation chamber, in which the solids collect, and an outflow chamber, to which the cleaned liquid passes by way of a transfer aperture sited near the rotation axis. It is common in modern designs, such as, EP 0193000 and GB 2283694, for this partition wall to extend both radially and axially as what is sometimes referred to as a separation cone, which better holds solids and liquid-containing sludge within the separation chamber if the rotation axis is tilted from the vertical.

There are several criteria associated with successful operation. Lubricant supplied to the rotor has to be available at a significant pressure if the energy lost by its passage through the reaction jet nozzles is to be sufficient to rotate the rotor fast enough to effect centrifugal separation of said contaminated particles. Also, of course, the lubricant passed through the centrifugal separator loses substantially all of its energy in effecting rotation by jet reaction, that is, it is returned directly to the sump and by-passes the normal lubrication utilisation circuits of the engine, so that the centrifugal separator operates in a so-called lubricant by-pass mode. Consequently, there is normally incorporated in the lubricant supply system a pressure responsive valve which inhibits the flow to the centrifugal separator when the supply pressure is below a predetermined level at which the engine might be starved of lubricant if any were diverted and at which the rotor would not operate efficiently even if supplied.

Such a centrifugal separator is normally associated with a conventional full-flow, or through-flow, filter (although the small particle separation capabilities of the centrifugal separator enables a rather coarser mesh filter to be used than otherwise) and it is often arranged that both filter and separator are mounted on a specially designed interface which includes supply ducts and pressure responsive flow control valves, for example as shown in GB 2160449 and GB 2160796.

Diesel engines are particularly well suited to this form of lubricant cleaning, because of problems of small, light particles in the lubricant that result from combustion products and the generally longer intervals between servicing operation than has been normal with gasoline engines. Thus the combination of a coarse mesh, full-flow filter and centrifugal separator is particularly suited to operation of, and has been widely adopted with, commercial vehicles to maximise intervals between servicing operations.

More recently, it has become popular to include similar diesel engines in small passenger vehicles and, irrespective of engine type, for there to be longer intervals between servicing at which lubricant and/or filter elements would be changed, it being conventional now in relation to passenger vehicles that contaminated components of such filter elements are disposable rather than cleanable by the servicing mechanic, who is frequently the vehicle owner.

Thus it follows that in adapting the concept of supplementing a full-flow filter with a centrifugal separator to such small passenger vehicles, the rotor, when it does eventually fill with contaminant, should be disposable and replaceable with a new one rather than cleaned, and notwithstanding the increased interval between replacements, the disposable rotor must be a low cost item. To this end low cost disposable rotor designs exist, for example EP 0193000, and GB 2283694 which rely upon the rotor being formed as a canister from pressed sheet materials.

However, it is found that centrifugal separators, particularly those of such a pressed sheet construction, exhibit characteristics peripheral to their separation functionality which may militate against ready acceptance within the small passenger vehicle environment.

In such passenger vehicles, although the passenger compartment is much closer to the engine and its ancillary components, there is required a much lower noise level than for commercial vehicles. Whereas any additional noise level caused by a spinning centrifugal separator rotor may be considered minimal in terms of passenger perception whilst the engine is running, it is found that an increased noise level continuing after the engine is stopped is particularly objectionable.

When the engine is stopped the centrifuge rotor, which may be spinning up to 10,000 rpm, continues to rotate for a considerable deceleration or wind-down period that may be in the range of 30–60 seconds or even up to 90 seconds, depending upon the supply pressure and temperature of lubricant passing therethrough, and during that wind-down period the noise level may increase as the rotor empties of lubricant and exhibits bearing contact and out-of-balance vibration as the speed falls and the bulk of the liquid moves about within the partially filled container.

The centrifuge rotor is usually mounted for rotation by bearings comprising plain, parallel bushes carried at each end of the rotor and surrounding fixed, vertically extending axle means to form journal bearings.

The bushes are a clearance fit on the axle means to permit unimpeded rotation and the gap between each bush and axle means is exposed to the lubricant supplied to the rotor such that some lubricant escapes along the gap and with the rotation creates a hydrodynamic film that provides easy rotation and significant radial stiffness. Furthermore, it is known to make use of the forces exerted axially on the bushes and rotor, due to exposure of the ends of the bushes to fluid pressure, to counter the effect of gravity pulling the rotor downwardly along the axle means by having the upper bush of smaller diameter than the lower bush whereby the lubricant pressure acts on different areas to lift the rotating rotor. Each of said bushes may therefore also comprise a radially extending flange to bear against an axially facing surface of the housing, as a pressure lift thrust bearing at the upper part of the housing to limit lifting of the rotor and (particularly) as a weight thrust bearing at the lower part of the housing to support its weight in the absence of lubricant pressure.

It will be appreciated that such weight thrust bearing is employed each time that the lubricant supply is stopped and the weight of the rotor is not countered by lubricant supply pressure. Furthermore, it will be appreciated that the supply of lubricant to the journal bearing gaps also effectively ceases with lubricant supply so that as the rotor winds down, the radial bearing stiffness ceases, permitting the rotor to vibrate on the bearings, both journal and thrust, with the transmission of noise by way of the housing to the engine.

The vibration may be exacerbated as the balance of the rotor is affected by way of lubricant draining therefrom and not being replenished.

To the extent that wind-down noise results from such draining of the rotor, co-pending application number GB9511812.1 describes a flow check valve to retain lubricant within the centrifuge rotor.

However it does not address the problem of wind-down noise resulting directly from the reduction in bearing stiffness as the and hydrodynamic film between bushes and axles means disrupts when the lubricant pressure subsides.

SUMMARY OF THE INVENTION

It is an object of the present invention to provide a centrifugal separator in which vibration on wind-down due to bearing structure is mitigated.

According to the present invention, a centrifugal separator comprising a housing, axle means extending along the housing substantially vertically and defining a rotation axis, a rotor rotatable about the rotation axis about said axle means and including at each end thereof a bush surrounding the axle means defining a journal bearing, each said bush being exposed to lubricant supplied to the rotor such that lubricant can pass between said bush and axle means to form therein a film, at least one of the bushes providing weight thrust bearing means operable to support the weight of the rotor, at least during wind-down, the weight thrust bearing means comprising at least one portion of said axle means tapering from a lower region of greater diameter to an upper region of lesser diameter and said bush surrounding the portion conforming to the taper, defining a combined journal and thrust bearing whereby the rotor carried by the thrust bearing is supported both radially and axially.

Preferably the end of the upper bush exposed to lubricant pressure is a lesser diameter than the upper end of the lower bush such that normal lubricant supply pressure acts to separate the cooperating [taped] *tapered* surfaces of the weight thrust bearing means.

Preferably the weight thrust bearing means is defined in both upper and lower bushes.

Embodiments of the invention will now be described by way of example with reference to the accompanying drawings.

DETAILED DESCRIPTION OF THE DRAWINGS

Figure 1:
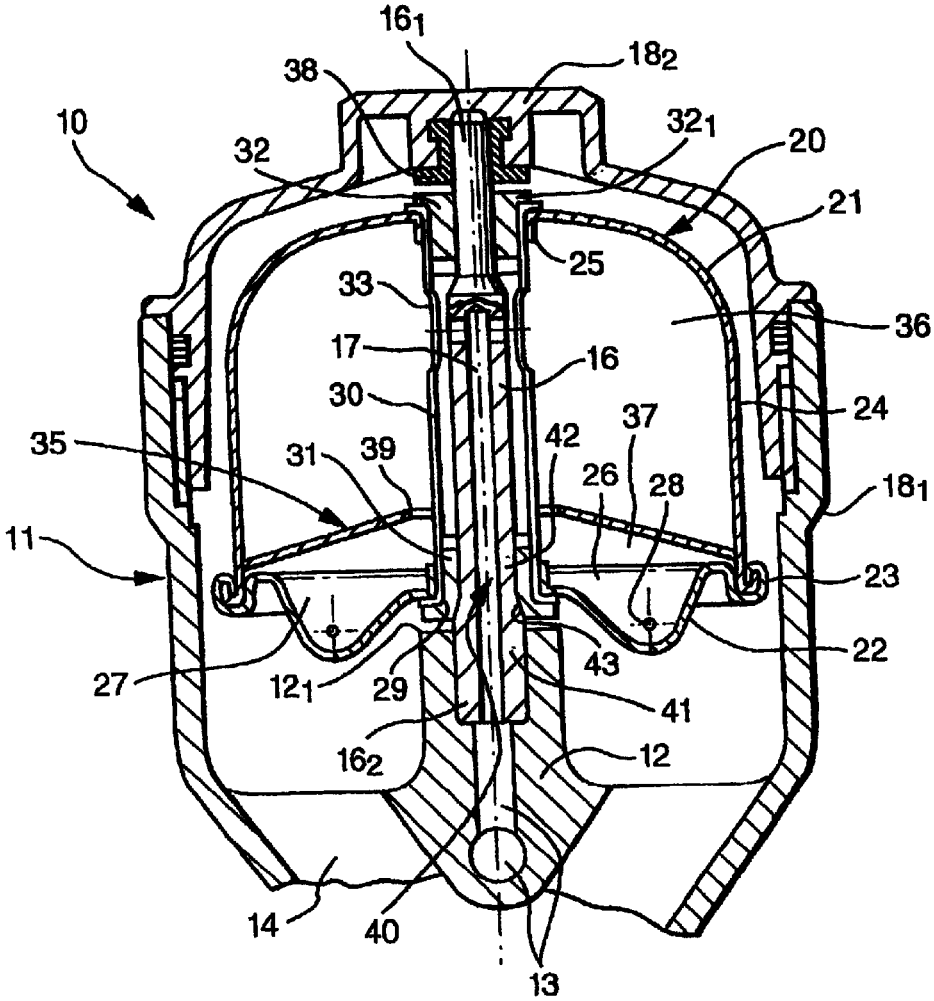
FIG. 1 is a sectional elevation through a first embodiment of self-powered centrifugal separator in accordance with the invention showing a novel weight thrust bearing formed between the lower rotor bush and the tapered spindle.
Figure 2:
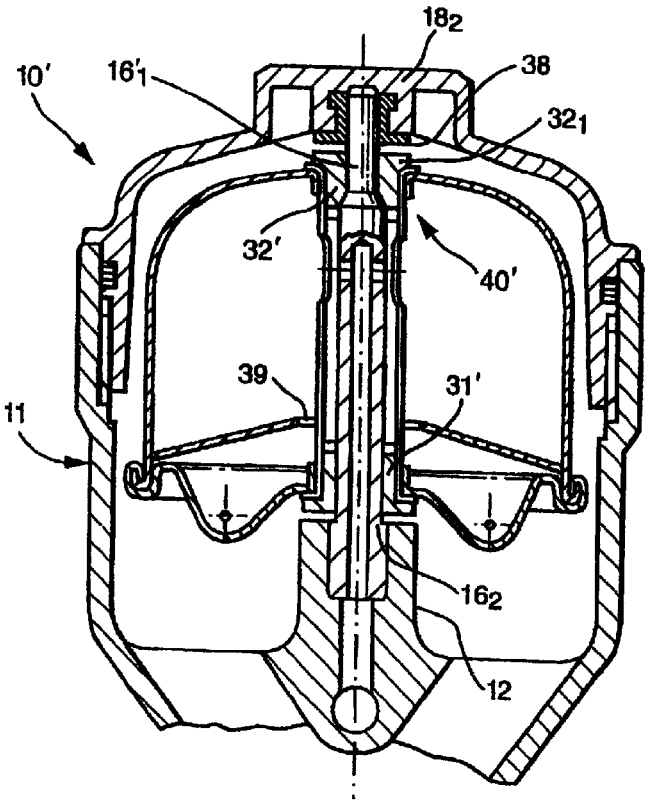
FIG. 2 is a sectional elevation through a second embodiment in which the weight thrust bearing is formed at the upper bush.

Referring to FIGS. 1 and 2, a self-powered centrifugal separator arrangement for a vehicle engine, particularly a small passenger vehicle, is indicated generally at 10. The separator is employed in conjunction with a full flow filter (not shown) in maintaining the engine lubricant free of potentially damaging contaminants. Lubricant is pumped around the engine by a pump (not shown) whose delivery pressure is regulated but also, to a limited extent, dependent upon engine speed and lubricant temperature.

The separator arrangement 10 comprises a housing 11 in the form of a support structure 12 coupled to the engine to receive pumped lubricant by way of supply duct 13 and return it to the sump by way of drain duct 14, thereby by-passing the engine components which use the pumped lubricant. The support structure 12 has fixed thereto a substantially vertically extending axle means 16 in the form of a spindle which has a passage 17 extending at least part way along and couple to the supply duct 13 at its lower end. The housing is in vertically separable parts $\mathbf{18}_1$ and $\mathbf{18}_2$ and the upper end of the spindle $\mathbf{16}_1$ is secured to, and secures, a housing part $\mathbf{18}_2$ releasably sealed to the part $\mathbf{18}_1$.

A rotor 20 is mounted within the housing for rotation about the spindle 16. The rotor is substantially conventional in comprising a container formed from pressed steel sheet components 21 and 22 jointed at a folded seam 23. The component 21 has a peripheral wall 24 which extends radially inwardly at one end of the rotor to an aperture 25. The component 22 forms a substantially radially extending base in which are found recesses 26, 27 containing a pair of tangentially direction jet reaction nozzles, one only of which is visible at 28, the base component being apertured at 29 in line with aperture 25 on the longitudinal axis of the rotor.

A hollow member 30 extends between and through the axially spaced apertures 25 and 29, being swaged to the container components to act as a spacer for the end walls and a receptacle for bearing bushes 31 and 32 which support the rotor for rotation about spindle 16, the longitudinal axis of the rotor therefore being synonymous with the rotation axis of the rotor.

The spindle passage 17 opens into the spacer member, which is apertured at 33 to admit liquid lubricant at supply pressure to the container from the rotation axis. The spacer member 30 thus forms a radially inner wall for the container.

Within the container, internal partition wall 35 extends radially inwardly from the peripheral wall at the seam 23 and divides the container into a separation chamber 36 (in which contaminants are separated from the liquid lubricant) and an outflow chamber 37 in communication with the reaction nozzles, 28 etc. The radially inner periphery of the partition wall defines a transfer aperture 39 between the separation and outflow chambers 36 and 37. The partition wall 35, although extending radially inwardly is also inclined with respect to the rotation axis at an acute angle being frusto-conical in elevation, the arrangement serving to inhibit solid contaminants which tend to collect within the radially outer peripheral wall from falling into the outflow container with attendant risk of reaction nozzle blockage or return to the lubricant sump. To this end, such an inclined partition wall is frequently called a separation cone.

The upper part of the spindle $\mathbf{16}_1$ is of lesser diameter than the lower part, $\mathbf{16}_2$, such that the ends of the bushes 31 and 32 have differential [fare] *face* areas exposed to the lubricant pressure in tubular member 30, and thus also have forces acting thereon related to such diameter. Thus in operation a greater force acts on the upper bush 32 in an upward direction which tends to lift the rotor to counter its weight, the degree of lift being dependant on instantaneous supply pressure. Clearly if the pressure is such that the pressure-induced lift exceeds the weight of the rotor the rotor will move to contact the housing part $\mathbf{18}_2$ and to accommodate this is pressure lift thrust bearing is formed by substantially radially extending flanges $\mathbf{32}_1$ of bush 32 and static bush 38 secured to the housing part.

The rotor thus far described is essentially conventional.

The weight of the rotor is taken, except when overcome by said pressure-induced lift, by weight thrust bearing means. Conventionally such weight thrust bearing means comprises an image of the pressure lift thrust bearing, that is, radially extending flange surface to the lower end of bush 31 and upper end $\mathbf{12}_1$ of support structure 12.

However, in accordance with the present invention, weight thrust bearing means 40 comprises the lower portion $\mathbf{16}_2$ of the spindle and bush 31. The spindle portion $\mathbf{16}_2$ tapers from a lower region 41 of greater diameter to an upper region 42 of lesser diameter, the tapered region 43 having a shallow taper, that is, large included angle.

The bush 31 has a corresponding taper to a part of its internal surface such that it both surrounds the upper region 41 and the tapered region 43 of the spindle.

The tapered region thus provides a thrust bearing which supports the weight of the rotor at rest when supply pressure is below a level at which the pressure-induced lift overcomes the weight.

However, when after normal operation supply pressure ceases as the engine is stopped and the aforementioned clearances between bushes and spindles are deprived of radial stiffness from the lubricant, the weight of the rotor tends to seat it on the tapered weight thrust bearing and the tapered surfaces act also to centre the bush with respect to the spindle, that is, re-introduce an effective radial stiffness which mitigates the vibration due to bearing clearance.

It will be appreciated that the degree and form of taper is open to variation, provided the taper is shallow enough not to result in wedging effects, as is the extension of the bush axially both sides of the tapered region.

It will be appreciated that the weight thrust bearing may be defined within the upper bush as indicated in separator 10' in FIG. 2 at 40' with modified bush form 32' and spindle portion $\mathbf{16}_1$' having cooperating tapers and the lower spindle portion and lower bush form 31' having no cooperating tapers.

Figure 3:
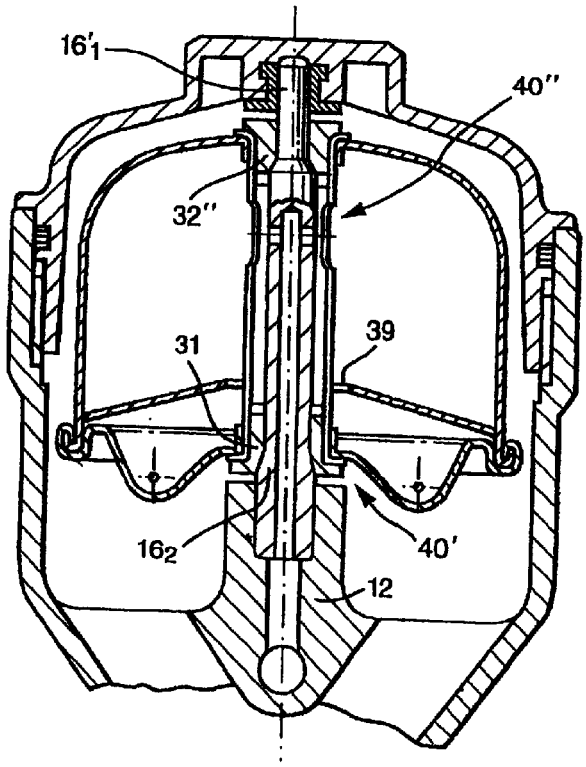
FIG. 3 is a sectional elevation through a third embodiment in which the thrust bearing is formed in both upper and lower bushes.

Conveniently, and as shown in FIG. 3 for separator 10", the weight thrust bearing 40" is defined within both the lower bush 31 and upper bush 32' by cooperating tapers to both the spindle end portions and the bush pores.

It will be appreciated that instead of a single continuous spindle 16 the axle means may comprise a stub spindle exiting from each end of the housing. In such arrangement, where the upper spindle portion is inserted vertically into the upper bush and not vice versa, the pressure lift thrust bearing may be formed by tapered co-operating surfaces similar to the lower weight thrust bearing.

Also, the provision of pressure-induced lift, and the corresponding pressure lift thrust bearing, may be omitted, so that the rotor normally operates in contact with the weight thrust bearing.

What is claimed is:

1. A centrifugal separator comprising a housing, axle means extending along the housing substantially vertically and defining a rotation axis, a rotor rotatable about the rotation axis about said axle means and including an upper bush and a lower bush at respective upper and lower ends of said axle means, said upper bush and said lower bush each surrounding the axle means defining a journal bearing, and each being [exposed to] *constructed to receive* lubricant supplied to the rotor [such that] *allowing* lubricant [can] *to* pass between said upper bush and said lower bush and said axle means to form therein a film, at least one of said upper bush and said lower bush providing weight thrust bearing means operable to support the weight of the rotor, at least during wind-down, the weight thrust bearing means comprising at least one portion of said axle means tapering from a lower region of greater diameter to an upper region of lesser diameter and said at least one of said upper bush and said lower bush surrounding the portion conforming to the taper and defining a combined journal and thrust bearing whereby the rotor carried by the thrust bearing is centered with respect to the axle means and supported both radially and axially*, wherein the rotor includes an upper wall and a lower wall, the upper wall having an upper aperture and the lower wall having a lower aperture, wherein the upper bush is disposed within the upper aperture and the lower bush is disposed within the lower aperture, wherein the upper wall and upper bush and the lower wall and lower bush define a container for receiving a pressurized fluid, wherein the lower bush has a greater inner diameter than the upper bush, and wherein, when the container is filled with a pressurized fluid, the force created by the pressurized fluid and acting on the upper wall and upper bush is greater than the force created by the pressurized fluid and acting on the lower wall and lower bush because of the difference in inner diameter between the lower and upper bushes, thereby pushing the rotor upwards*.

2. A centrifugal separator as claimed in claim 1 in which the end of the upper bush exposed to lubricant pressure has a lesser inner diameter than the upper end of the lower bush such that in normal operation lubricant supply pressure acts to separate the conforming tapered surfaces of the weight thrust bearing means.

3. A centrifugal separator as claimed in claim 1 in which the weight thrust bearing means is defined in both upper and lower bushes.

[4. A centrifugal separator comprising a housing, axle means extending along the housing substantially vertically and defining a rotation axis, a rotor rotatable about the rotation axis about said axle means and including an upper bush and a lower bush at respective ends of said axle means, said upper bush and said lower bush each surrounding the axle means defining a journal bearing, and each being exposed to lubricant supplied to the rotor such that lubricant can pass between said upper bush and said lower bush and said axle means to form therein a film, one of said upper bush and said lower bush at one of said respective ends of said axle means exposing a greater face area to said lubricant than the other of said upper bush and said lower bush such that, when the lubricant is under pressure, said rotor will move toward one of said respective ends of said axle means; and a weight thrust bearing at the other of said respective ends of said axle means for supporting said rotor when the lubricant pressure is reduced, said weight thrust bearing including cooperating tapered surfaces on said axle means and the other of said upper bush and said lower bush.]

*5. A rotor for use with a centrifugal separator, the centrifugal separator including a housing and an axle extending along the housing substantially vertically and defining a rotation axis, at least one portion of the axle tapering from a lower region of greater diameter to an upper region of lesser diameter, comprising:*

*a container including an upper wall and a lower wall, the upper wall having an upper aperture and the lower wall having a lower aperture, the upper and lower apertures being aligned on a longitudinal axis of the container; and*

*an upper bush disposed within the upper aperture and a lower bush disposed within the lower aperture, at least one of the upper bush and the lower bush including a taper on a lower inner portion thereof tapering from an upper region of lesser diameter to a lower region of greater diameter, wherein the upper wall and upper bush and the lower wall and lower bush define a chamber for receiving a pressurized fluid;*

*wherein the lower bush has a greater inner diameter than the upper bush, and wherein, when the container is filled with a pressurized fluid, the force created by the pressurized fluid and acting on the upper wall and upper bush is greater than the force created by the pressurized fluid and acting on the lower wall and lower bush because of the difference in inner diameter between the lower and upper bushes, thereby pushing the rotor upwards;*

*wherein the upper bush and the lower bush are each adapted to surrounding the axle of the centrifugal separator to define a respective journal bearing when the rotor is installed in the centrifugal separator;*

*wherein when the rotor is installed in the centrifugal separator, the rotor is adapted to being rotatable about the rotation axis about the axle; and*

*wherein at least one of the upper bush and the lower bush is adapted to, when the rotor is installed in the centrifugal separator, providing a weight thrust bearing being adapted to supporting the weight of the rotor, at least during wind-down, the weight thrust bearing formed from the at least one portion of the axle tapering from a lower region of greater diameter to an upper region of lesser diameter and a respective one of the upper bush and the lower bush with a taper conforming to the tapered axle portion, the respective tapered upper or lower bush surrounding the tapered portion of the axle to define a combined journal and thrust bearing whereby the rotor carried by the thrust bearing is centered with respect to the axle and supported on the axle both radially and axially.*

*6. A rotor as claimed in claim 5, wherein each of the bushes is adapted to being exposed to lubricant supplied to the rotor such that lubricant can pass between the upper bush and the lower bush and the axle to form therein a film.*

*7. A rotor as claimed in claim 5, wherein the weight thrust bearing is defined in both upper and lower bushes.*

*8. A rotor as claimed in claim 5, further comprising a hollow member extending from the lower aperture to the upper aperture, wherein the hollow member is in fluid communication with the container, wherein an end of the hollow member is placed in the lower aperture and another end is placed in the upper aperture, and wherein the upper bush is disposed within the upper end of the hollow member and the lower bush is disposed within the lower end of the hollow member.*

*9. A rotor for use with a centrifugal separator, the centrifugal separator including an axle, at least a first portion of the axle tapering from a lower region of greater diameter to an upper region of lesser diameter, comprising:*

*a container including an upper wall and a lower wall, the upper wall having an upper aperture and the lower wall having a lower aperture, the upper and lower apertures being aligned on a longitudinal axis of the container;*

*an upper bush having an inner diameter, the inner diameter including a taper on a lower portion thereof from an upper region of lesser diameter to a lower region of greater diameter, the upper bush disposed within the upper aperture; and*

*a lower bush having an inner diameter, the lower bush disposed within the lower aperture;*

*wherein the inner diameter of the lower bush is greater than the inner diameter of the upper bush, wherein the upper wall and upper bush and the lower wall and lower bush define a chamber for receiving a pressurized fluid, and wherein, when the container is filled with a pressurized fluid, the force created by the pressurized fluid and acting on the upper wall and upper bush is greater than the force created by the pressurized fluid and acting on the lower wall and lower bush because of the difference in inner diameter between the lower and upper bushes, thereby pushing the rotor upward; and*

*wherein when in an operable configuration with the centrifugal separator, the axle is adapted to being disposed through the first and second bushes, the taper of the first bush surrounding the taper of the first portion of the axle to form a weight thrust bearing.*

*10. The rotor of claim 9, wherein the inner diameter of the upper bush includes a taper on a lower portion thereof from an upper region of lesser diameter to a lower region of greater diameter and wherein the taper of the upper bush is adapted to surrounding a taper of an upper portion of the axle from a lower region of greater diameter to an upper region of lesser diameter to form an upper weight thrust bearing when the rotor is installed in the centrifugal separator.*

*11. The rotor of claim 9, wherein the inner diameter of the lower bush includes a taper on a lower portion thereof from an upper region of lesser diameter to a lower region of greater diameter and wherein the taper of the lower bush is adapted to surrounding a taper of a lower portion of the axle from a lower region of greater diameter to an upper region of lesser diameter to form a lower weight thrust bearing when the rotor is installed in the centrifugal separator.*

*12. A rotor of claim 9, further comprising a hollow member extending from the lower aperture to the upper aperture, wherein the hollow member is in fluid communication with the container, wherein an end of the hollow member is placed in the lower aperture and another end is placed in the upper aperture, and wherein the upper bush is disposed within the upper end of the hollow member and the lower bush is disposed within the lower end of the hollow member.*

*13. A rotor, comprising:*

*a container including an upper wall and a lower wall, the upper wall having an upper aperture and the lower wall having a lower aperture, the upper and lower apertures being aligned on a longitudinal axis of the container;*

*an upper bush having an inner diameter, the inner diameter including a taper on a lower portion thereof from an upper region of lesser diameter to a lower region of greater diameter, the upper bush disposed within the upper aperture; and*

*a lower bush having an inner diameter, the lower bush disposed within the lower aperture;*

*wherein the inner diameter of the lower bush is greater than the inner diameter of the upper bush, wherein the upper wall and upper bush and the lower wall and lower bush define a chamber for receiving a pressurized fluid, and wherein, when the container is filled with a pressurized fluid, the force created by the pressurized fluid and acting on the upper wall and upper bush is greater than the force created by the pressurized fluid and acting on the lower wall and lower bush because of the difference in inner diameter between the lower and upper bushes, thereby pushing the rotor upwards.*

*14. The rotor of claim 13, wherein the inner diameter of the upper bush includes a taper on a lower portion thereof from an upper region of lesser diameter to a lower region of greater diameter.*

*15. The rotor of claim 13, wherein the inner diameter of the lower bush includes a taper on a lower portion thereof from an upper region of lesser diameter to a lower region of greater diameter.*

*16. A rotor of claim 13, further comprising a hollow member extending from the lower aperture to the upper aperture, wherein the hollow member is in fluid communication with the container, wherein an end of the hollow member is placed in the lower aperture and another end is placed in the upper aperture, and wherein the upper bush is disposed within the upper end of the hollow member and the lower bush is disposed within the lower end of the hollow member.*

*17. A rotor, comprising:*

*a container including an upper wall and a lower wall, the upper wall having an upper aperture and the lower wall having a lower aperture, the upper and lower apertures being aligned on a longitudinal axis of the container;*

*a lower bush having a taper on a lower portion of an inner diameter of the lower bush, the lower bush disposed within the lower aperture; and*

*an upper bush having an inner diameter, the upper bush disposed within the upper aperture;*

*wherein the inner diameter of the lower bush is greater than the inner diameter of the upper bush, wherein the upper wall and upper bush and the lower wall and lower bush define a chamber for receiving a pressurized fluid, and wherein, when the container is filled with a pressurized fluid, the force created by the pressurized fluid and acting on the upper wall and upper bush is greater than the force created by the pressurized fluid and acting on the lower wall and lower bush because of the difference in inner diameter between the lower and upper bushes, thereby pushing the rotor upwards.*

*18. The rotor of claim 17, wherein the inner diameter of the upper bush includes a taper on a lower portion thereof.*

*19. A rotor of claim 17, further comprising a hollow member extending from the lower aperture to the upper aperture, wherein a larger end of the hollow member is placed in the lower aperture and a smaller end is placed in the upper aperture, and wherein the upper bush is disposed within the smaller upper end of the hollow member and the lower bush is disposed within the larger lower end of the hollow member.*

* * * * *